Dec. 16, 1952        G. F. WALES        2,621,480

FLUID CUSHIONED CLUTCH MECHANISM

Filed Jan. 28, 1949        8 Sheets-Sheet 1

Fig. 1.

INVENTOR.
George F. Wales
BY
Edwin B. Gary
Attorney

Dec. 16, 1952 G. F. WALES 2,621,480
FLUID CUSHIONED CLUTCH MECHANISM
Filed Jan. 28, 1949 8 Sheets-Sheet 2

Fig. 2.

INVENTOR
George F. Wales
BY
Edwin B. Gary
Attorney

Dec. 16, 1952   G. F. WALES   2,621,480
FLUID CUSHIONED CLUTCH MECHANISM
Filed Jan. 28, 1949   8 Sheets-Sheet 6

INVENTOR.
George F. Wales
BY
Edwin B. Gary
Attorney

Dec. 16, 1952 G. F. WALES 2,621,480
FLUID CUSHIONED CLUTCH MECHANISM
Filed Jan. 28, 1949 8 Sheets-Sheet 7

INVENTOR.
George F. Wales
BY Edwin B. Gary
Attorney

Patented Dec. 16, 1952

2,621,480

UNITED STATES PATENT OFFICE 2,621,480

FLUID CUSHIONED CLUTCH MECHANISM

George F. Wales, Kenmore, N. Y.

Application January 28, 1949, Serial No. 73,271

30 Claims. (Cl. 60—54.5)

This invention relates to power transmitting devices, being concerned more particularly with such a device wherein the movement of a driving member is transmitted hydraulically to a driven member.

The transmission of energy from a prime source of power to a source of work has universal application in the mechanical art. The two basic elements for transmitting energy are revolving or reciprocating members and in most all types of mechanisms these basic elements are intermixed to provide the desired characteristics. For instance: in many mechanical applications a power driven revolving shaft is caused to drive a gear or other rotary type fluid pump whereby fluid under pressure may be applied by means of a multiple port valve to either side of a piston so as to cause it to reciprocate intermittently under control of the valve. A mechanical counterpart of the above arrangement comprises a revolving eccentric which imparts reciprocal movement to a member restrained to linear movement. In this latter construction a clutch is generally placed before the rotating eccentric so as to engage or disengage it from the source of power to perform the function of the valve in the hydraulic apparatus. In the first arrangement, the limit on fluid velocity due to pump capacity, frictional losses of the pipes, etc., results in a comparatively slow cushioned movement of the reciprocating piston. In the second arrangement a fast action is possible but the engagement of the mechanical parts results in high shock loads on the driving and driven elements.

In many applications in the mechanical field, the advantages of both of these systems, i. e., cushioned action with high speed, could be applied but heretofore such an arrangement has not been economically feasible.

It is the primary object of my invention to provide high velocity intermittent fluid cushioned power transmission.

Another primary object of this invention is to provide a simple, economical apparatus for transmitting energy to a reciprocating member which is positive in action and rugged and durable in use.

It is another object of this invention to provide a simple, fluid cushioned power transmission mechanism.

A companion object of this invention is to provide a quiet mechanism wherein all the mechanical engagement noise is eliminated.

Still another object of this invention is to provide a simple integral mechanism which may be assembled or disassembled as a unit from a machine.

Yet another object of this invention is to provide a mechanism which may be easily serviced.

Still a further object of this invention is to provide an integral mechanism adapted to be positioned adjacent the work area of a machine whereby the customary actuating linkage may be dispensed with.

Still another object of this invention is to provide a self-contained sequence assuring mechanism for actuating a reciprocable member.

A related object of this invention is to provide a fluid actuated reciprocable mechanism which can be utilized on a high speed machine.

A companion object of this invention is to provide a mechanism requiring less space.

Still a further object of this invention is to provide an integral pressure pad in a clutch mechanism for a press which provides for deep drawing of material when required.

A companion object is to provide a mechanism providing variable stroke or pressure.

Other objects and advantages of this invention will appear from the following descriptions and claims.

Fig. 12f shows the reciprocable cylinder retained in its upper position, the fluid being forced out at the beginning of the continuous idle cycle, illustrated in Fig. 12a.

Figure 1:
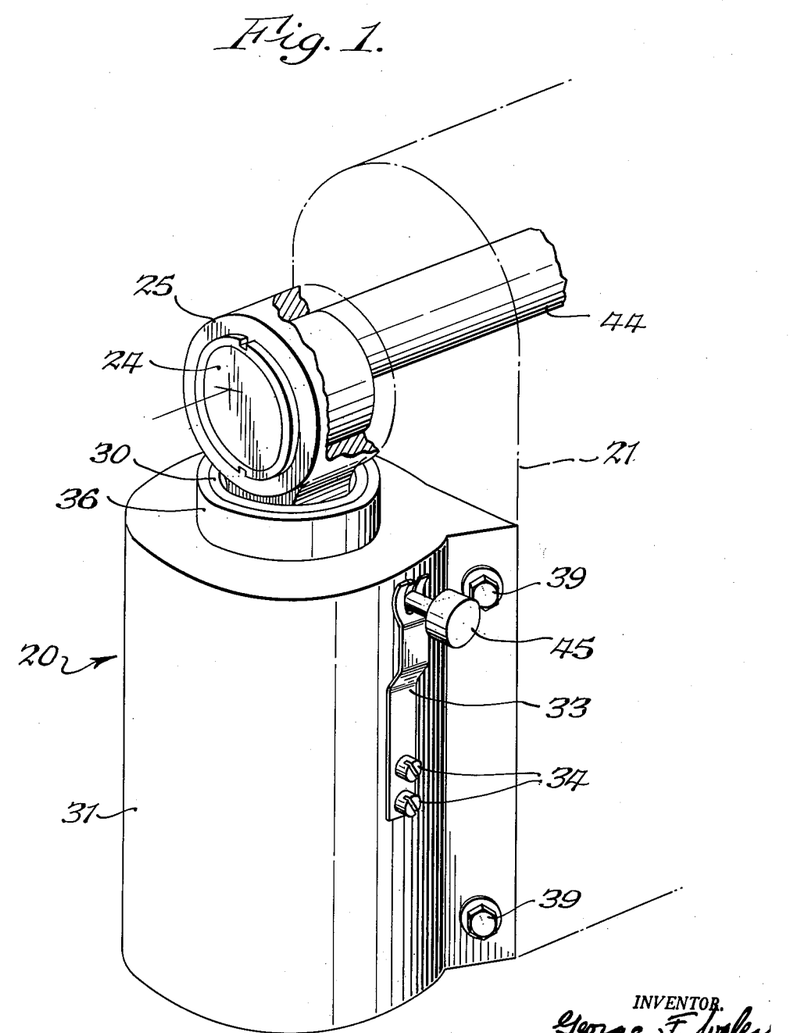
Fig. 1 is a perspective view of my machine element showing the eccentric driving means.
Figure 2:
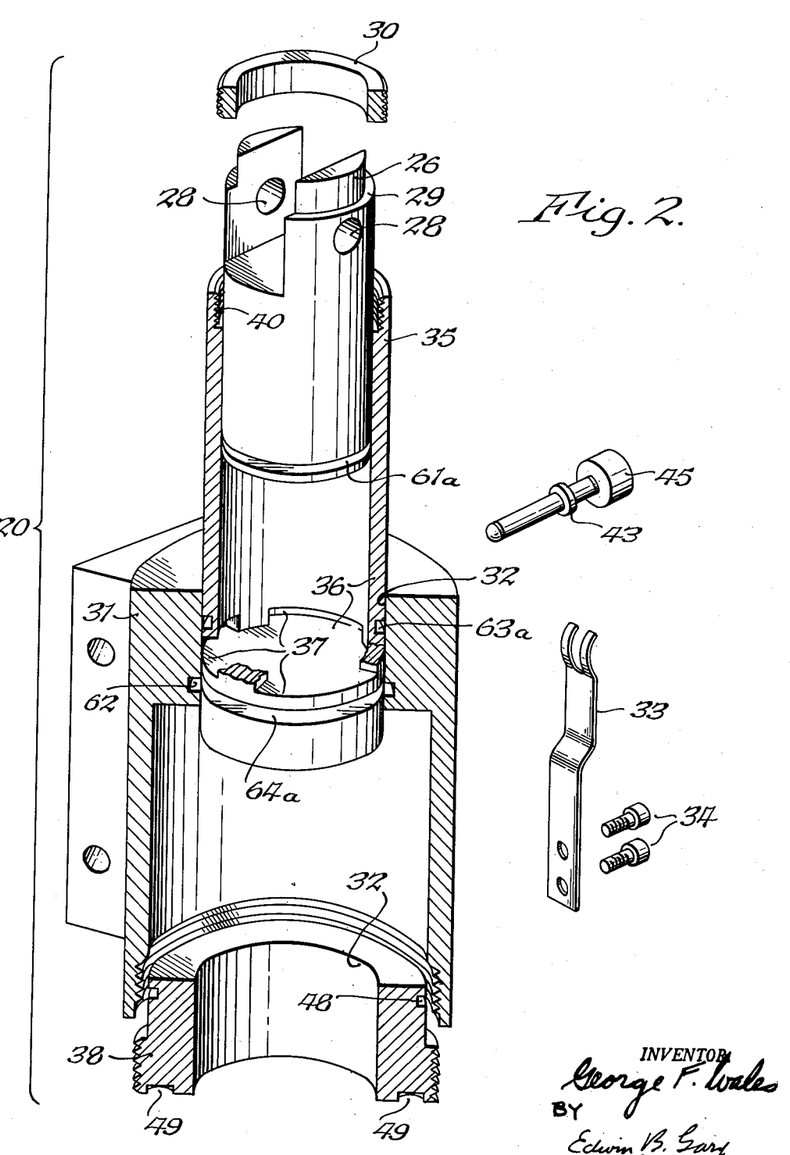
Fig. 2 is an exploded perspective view, in partial section of one version of my novel actuating mechanism.

In Fig. 1 it will be noted that I employ a revolving eccentric 24 on the extremity of a shaft 44 to provide a continuous reciprocation. A pitman 25 is utilized to transmit this constant reciprocation to a piston 26 within my novel mechanism. It will be obvious to those skilled in the art that any method for reciprocating piston 26 can be used and that the method here illustrated is irrelevant to the successful operation of my apparatus. Referring also to Fig. 2, the exploded view, it will be noted that piston 26 is joined to pitman arm 25, which is not illustrated in this view, by means of holes 28 in the piston, an axially aligned hole in the pitman arm, and a pin 68 which engages in these holes and which has also been omitted from this view for clarity. The piston 26 is reciprocally driven within the reciprocable ported cylindrical member 36. Ported cylindrical member 36 consists of a closed cylinder with a plurality of ports 37. Piston 26 is slidable within the upstanding cylindrical section 35 of member 36. Piston 26 has a seal ring 61 which is not shown herein so that its retaining groove 61a can be illustrated, and a shoulder portion 29 for engaging the lifter ring 30 when it is threadedly engaged in the internally threaded portion 40 of the upstanding sleeve 35 of the reciprocable cylindrical member 36. In the idling condition of my apparatus, piston 26 is reciprocating continuously within the reciprocable cylindrical member 36 and the fluid is coursing in and out of ports 37 as will be discussed later in connection with the small diagrammatic view of Fig. 12a. In this condition the reciprocable cylindrical member 36 is maintained stationary because of the engagement of pin 45 with the bore 41, in the cylindrical sleeve 35 of member 36. It should be noted that bore 41 is positioned so it is not visible in this view.

Having discussed the basic construction features of my apparatus, I will now refer to diagrammatic views, Fig. 12a through 12f, which illustrate the operation of my novel apparatus.

Figure 12A:
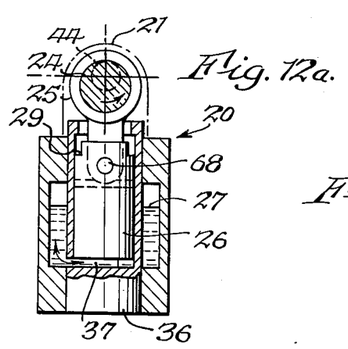
Fig. 12a is a diagrammatic view illustrating the action of the fluid when the apparatus is in the idling attitude of Fig. 3.

As previously described, Fig. 12a illustrates the piston 26 reciprocating freely in the reciprocable ported cylindrical member 36, because of the action of eccentric 24 of shaft 44 and the connecting pitman arm 25. In this attitude the fluid 27 is coursing back and forth through ports 37 of the ported cylindrical member 36 which is held stationary by pin 45.

Figures 12B, 12E:
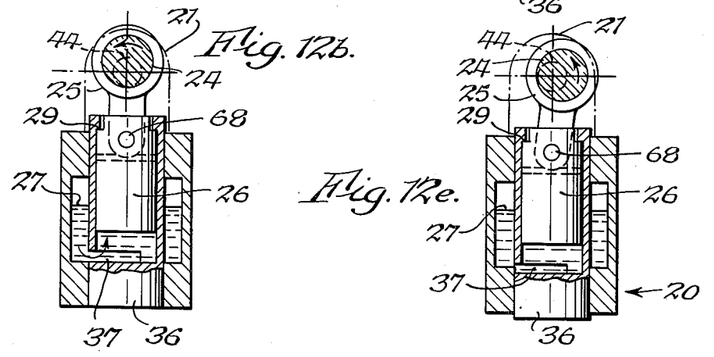
Fig. 12b illustrates the filling of the working chamber from the suction action of the piston so that the fluid can be entrapped on the actuating stroke.
Fig. 12e shows the return of the ported cylinder and the opening of its port area for the reciprocation of the fluid.

Fig. 12b shows the eccentric 24 of shaft 44 at its uppermost position, at which point the reciprocable ported cylindrical member 36 is released by means of some mechanism such as lifter ring 30 which lifts ram 36 and permits withdrawal of pin 45 in my disclosed apparatus, so that it will drop and seal the ports 37, while maintaining itself in juxtaposition to the stop 29 of the reciprocating piston 26, so as to entrap the fluid 27 which is contained between piston 26 and the ported cylindrical member 36.

Figure 12C:
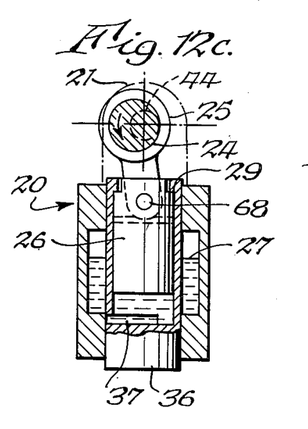
Fig. 12c shows the movement of the components of apparatus to effect reciprocal power transmission and illustrates that the fluid is sealed off as is illustrated in Fig. 6.

Fig. 12c shows the eccentric 24 of shaft 44 in a downwardly displaced position thereby moving coupled piston 26, and thus permitting the reciprocable cylindrical member 36, which is resting against piston stop 29 to drop to the sealed position of ports 37.

It will now be obvious to those skilled in the art, that since a portion of the fluid 27 is entrapped between the reciprocating piston 26 and the reciprocable cylindrical member 36, that piston 26 and cylindrical member 36 will now move in unison against the resisting force of any machine or apparatus. It could operate a cutting tool, punch or other tool, or any machine element attached to member 36.

Figure 12D:
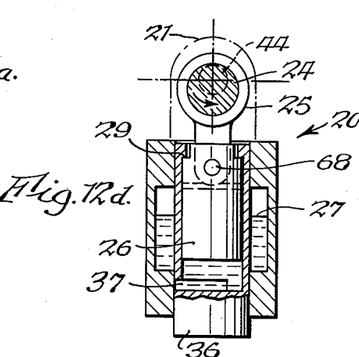
Fig. 12d shows the apparatus at the bottom of the stroke, as shown in Fig. 7.

Fig. 12d shows the eccentric 24 of shaft 44 in its lowermost position with the piston 26 and the juxtaposed cylindrical member 36 at the bottom of the power stroke.

Fig. 12e shows the eccentric 24 of shaft 44 on the return stroke with the ports 37 of the reciprocable cylindrical member 36 gradually being uncovered.

Figure 12F:
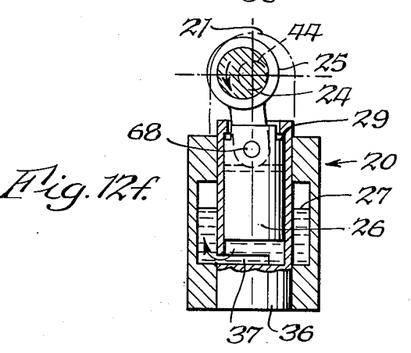

Fig. 12f shows the reciprocable cylindrical member 36 again retained in its stationary position at the top of its stroke by virtue of pin 45 which engages ram 36 as shown in Fig. 3 with the piston 26 again reciprocating relative thereto, so as to exhaust the fluid 27 through ports 37 in the action previously described in Fig. 12a.

Figure 3:
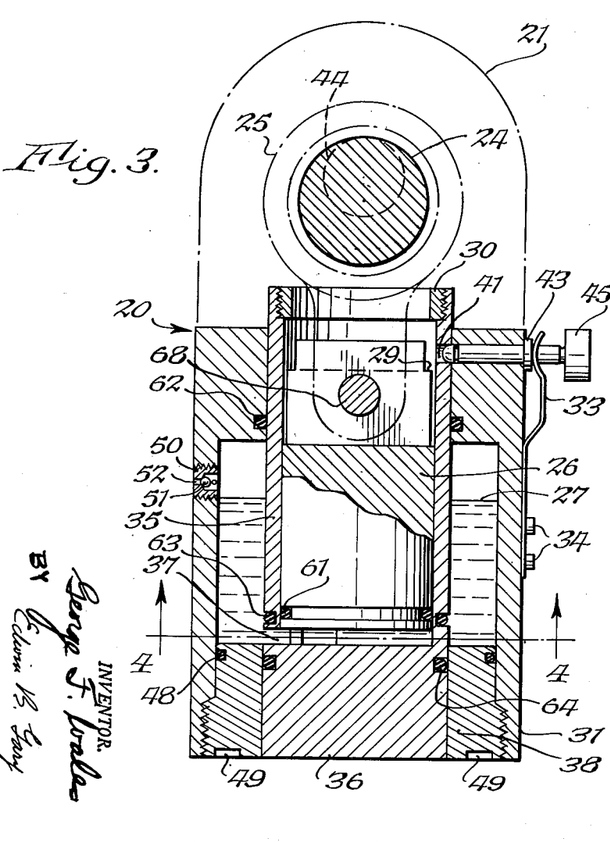
Fig. 3 is a front elevational view in partial section which illustrates the idling condition of this mechanism and the fluid working and reserve chambers.
Figure 4:
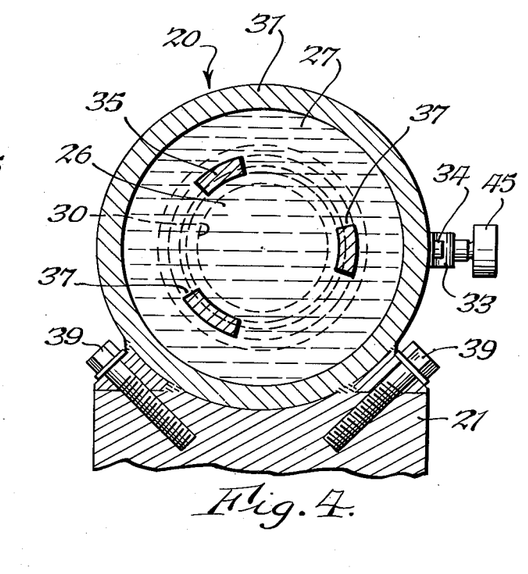
Fig. 4 is a sectional view taken as noted along line 4—4 of Fig. 3 which illustrates the concentric fluid working and reserve chambers and the ports which permit the fluid to course from reserve to working chambers.

Reference now will be made to Fig. 3 and Fig. 4, to illustrate in greater detail, some of the constructional features of this mechanism. It will be observed that reciprocable cylindrical member 36 has seals 63 and 64 shown in cross-section, on either side of the port 37 to effect sealing when cylindrical member 36 is caused to drop. It will be further observed that cylindrical portion 38 in which member 36 reciprocates, is threadedly engaged in housing 31 to effect adjustment of the port opening in the event fluids of greater viscosity are utilized which require maximum port openings. The seal 48 prevents a leakage of fluid therebetween. It will be noted that a check valve 50 is provided by means of ball 51 which allows air to enter above fluid 27 through the port opening 52, but prevents the ejection of air and vapor therefrom. This has proven to be important with regard to the unhampered movement of the reciprocable cylindrical member 36 as will be discussed hereafter.

The desired downward movement of the reciprocable cylindrical member 36, described heretofore, is assured because of its own weight, with the apparatus operating, since the frictional forces of the respective moving and stationary seals are nearly equal. However, in operation, the high velocity reciprocation of fluid 27 plus the friction of the moving seals causes heat which in turn results in a vapor pressure above fluid 27. This pressure is intended to assist the downward movement of the reciprocable cylindrical member after the machine is in operation because under the heat of operation relative movement of the reciprocable cylindrical member is more difficult. As there is some leakage past the seal rings, this internal pressure may escape when the machine is idle. If the piston 26 stopped at the bottom of its stroke, when its reciprocation was halted, the initial movement of piston 26 will create a reduced internal pressure in housing 31 which will prevent the movement of reciprocable cylinder 36 until the internal pressure is built up as previously described. However, the check valve 50 provides the instant relief of this reduced pressure and thereby prevents this malfunctioning. It will be also obvious that valve 50 could be omitted by providing a vent opening in housing 31 but the noise and vapor emitting therefrom might prove objectionable. It likewise follows that in horizontal or inverted installations check valve 50 could be replaced with a source of fluid pressure to assure movement of cylindrical member 36 by overcoming its inertia.

It will also be obvious to those skilled in the art, that the length of the power stroke is dependent upon the amount of fluid trapped between piston 26 and member 36 and that in order to obtain the maximum stroke it will be necessary to have the chamber formed therebetween filled completely. To assure this sequence of operation or timing, the lifting ring 30 threadedly engages a cylindrical portion 35 of member 36 and is adjusted so that the upstanding shoulder 29 of piston 26 just lifts the reciprocable cylindrical member 36 sufficiently at the top of the stroke against the internal pressure of the apparatus 20 created due to the expansion of the vapor and air above fluid 27 and acting against member 36, to permit the withdrawal of pin 45 at this point, thus timing the dropping of reciprocable member 36 to the reciprocal movement of piston 26 to assure the maximum fluid column and length of stroke. As shown in Fig. 3, pin 45 primarily serves as a holding means for preventing the movement of member 36 during reciprocation of piston 26. However, referring to Fig. 5, its other function is to time the sequence of operation of member 36 in combination with the internal pressure heretofore mentioned. Pressure on fluid 27 transmitted to member 36 exerts sufficient force on pin 45 to prevent its withdrawal except when the lifting ring 30 raises member 36 sufficiently against the force on pin 45 by bore 41 to reduce the holding force on pin 45 and permit its withdrawal.

Fig. 4 illustrates how the ports 37 are obtained by removing part of the cylindrical portion 35 of the reciprocable member 36. This view also illustrates how the bolts 39 are installed at a skewed axis to provide the maximum cross-sectional area for housing 31 and maximum fluid reserve chamber.

Figure 5:
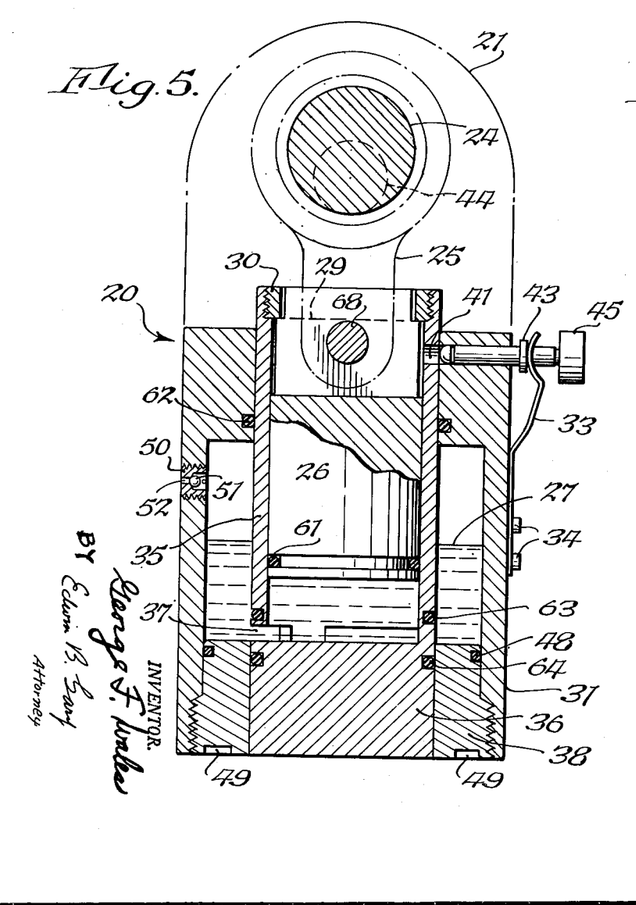
Fig. 5 is a view similar to Fig. 3 with the elements illustrated at the moment of actuation.

Refering now to Fig. 5, it will be observed that the pin 45 has been withdraw from bore 41 of the reciprocable cylindrical member 36 since the shoulder 29 of the piston 26 has lifted the reciprocable cylindrical member 36 slightly by means of the lifting ring 30 as shown diagrammatically in Fig. 12b.

Figure 6:
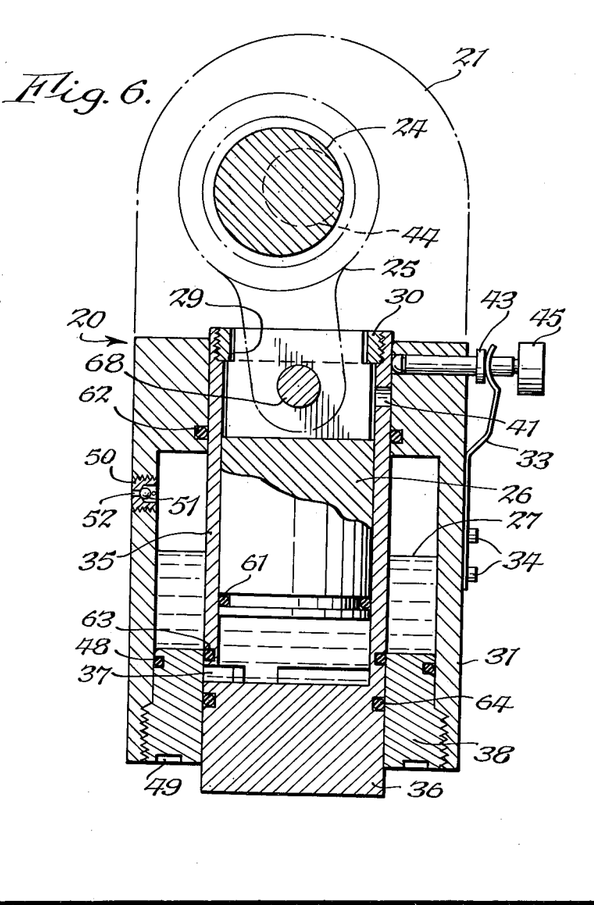
Fig. 6 is a view similar to Fig. 5 but with the elements sealed so that the fluid in the working chamber is trapped to cause the reciprocating power thrust.

Fig. 6 illustrates how the reciprocal piston 26 and reciprocable cylindrical member 36 move downwardly until seal ring 63 seals off ports 37 so as to entrap the fluid 27 between reciprocal piston 26 and reciprocable cylindrical member 36, as was illustrated in Fig. 12c. It will be observed that the ring 30 is in the same position with respect to shoulder 29 of the reciprocal piston 26 as it was in Fig. 5. This illustrates that the piston 26 and reciprocable member 36 are moving in unison. As illustrated, the pin 45 has now been released and is now being biased toward its resetting position by means of its shoulder 43 and the leaf spring 33 retained on housing 31 by bolts 34.

Figure 7:
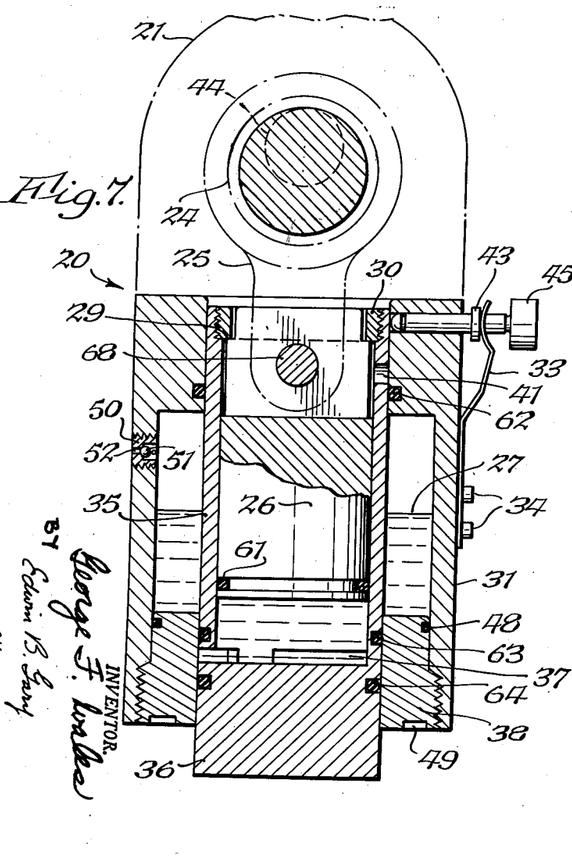
Fig. 7 is a view similar to Figs. 3 and 5 illustrating the cylinder at its lowermost position of operation.

Fig. 7 illustrates the reciprocable cylindrical member 36 in its lowermost position of the stroke which was shown diagrammatically in Fig. 12d.

Figure 8:
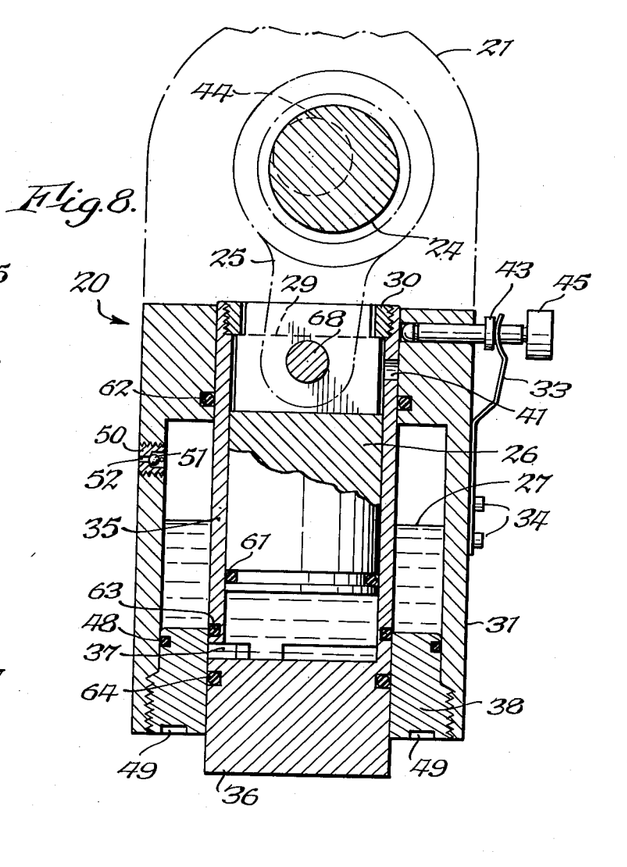
Fig. 8 is a like view essentially similar to Fig. 6 except that the port area is about to be uncovered as the cylinder returns to its uppermost position.

Fig. 8 shows the reciprocable cylindrical member returning to its former position of Fig. 1 as shown diagrammatically in Fig. 12e. As shown, the pin 45 is bearing against the side of member 36 and is ready to engage the bore 41 of member 36 when its lifter ring 30 has been moved to its extreme upper position by the shoulder 29 of piston 26, shown in Figs. 9 and 12f, aligning the bore 41 of member 36 with the pin 45 so that it can be easily engaged thereby due to the resilient biasing means 33. Member 36 is then rendered inoperative and piston 26 continues its constant reciprocation until the operator again pulls pin 45. It should be noted that the operator applies a constant tension to pin 45 but that it cannot be actuated until lifter ring 30 is engaged by shoulder 29 of piston 26 which reduces the force on pin 45 allowing it to be easily withdrawn. This action automatically times the apparatus and assures that the chamber formed between piston 26 and cylinder 36 is full of fluid and will provide the maximum stroke.

Figure 9:
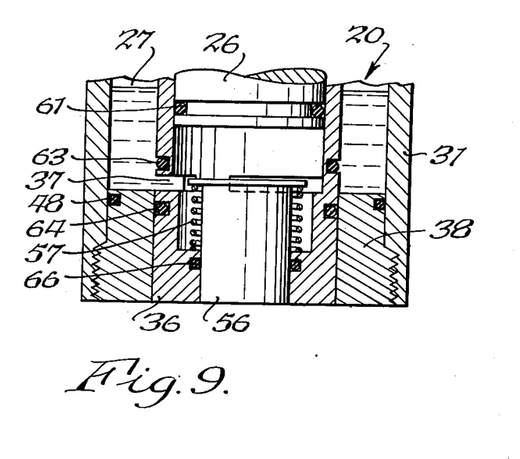
Fig. 9 is a partial sectional view which illustrates how this apparatus can be revised by the use of a dual plunger to provide variable stroke and/or pressure.

In Fig. 9 I illustrate a modification of my device which provides a double stroke action, or a multiplication of the length of power stroke for any machine use, depending upon the arrangement chosen. In this modification, another piston 56 is provided, which is slidable and reciprocable within the reciprocable cylindrical member 36 and sealed therebetween by means of seal 66. Resilient means 57 is biasing piston 56 to its uppermost position, so that the lower surface of the relatively reciprocable piston 56 and member 36 are flush. It should be noted that the fluid 27 is not illustrated within the cylinder 35, so that the construction may be more easily observed.

Figure 10:
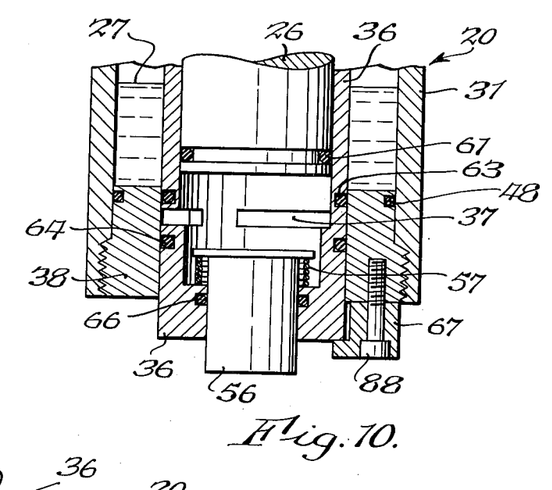
Fig. 10 illustrates this modified apparatus in its lowermost position to indicate the increased stroke which is possible with this construction and also the relative operation of the components of this variation of my device.

Fig. 10 illustrates this arrangement at the bottom of the stroke with a stop 67 fastened to the ring 38 by means of bolts 88 so as to limit the movement of reciprocable member 36, which in turn causes the reciprocable piston 56 to move downwardly, compressing resilient means 57, because of the reciprocating action of piston 26.

It will be obvious to those skilled in the art, that the reduction in area of reciprocable piston 56 over the reciprocating piston 26 will cause a greater movement of reciprocable piston 56 than is accomplished in the devices of my previous illustrations. This can be utilized to provide a greater stroke for any machine use by means of stop 67, or variable pressure or stroke depending upon whether the reciprocable members 36 or piston 56 are stopped, so that reciprocable piston 56 or cylindrical member 36 can be caused to operate in the sequence dependent upon the pressure on their relative parts. Conversely, if a plate is placed across the faces of the relatively reciprocable member 36 and piston 56 an apparatus will be provided which is identical in stroke characteristics to the device of Fig. 1 through Fig. 8.

Figure 11:
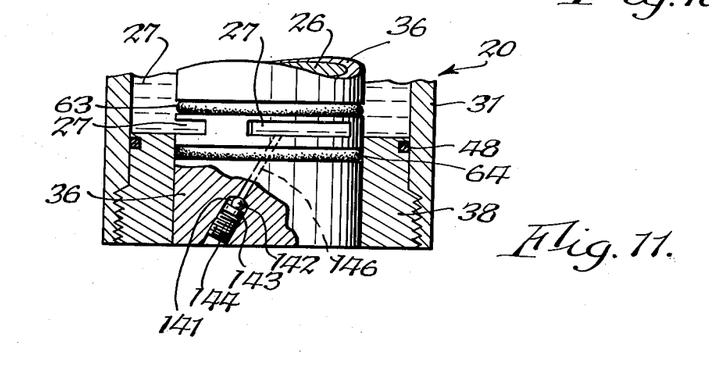
Fig. 11 illustrates safety pressure relief apparatus which permits the release of the entrapped fluid to relieve a jammed condition.

Fig. 11 illustrates a modification of my device's Figs. 1 through 8, which permits the release of the reciprocable cylindrical member 36 in the event it gets jammed after the port area is sealed off. It will be obvious to those skilled in the art, that threading the plug 144 out of the bore 141 permits the ball 142 to uncover the bore 146, so that the entrapped fluid can be relieved to permit a resumption of the machine operation. While I have shown this unit directly under the cylinder of the machine, it will be obvious to those skilled in the art that it can be positioned with a connecting passage to connect with the fluid 27. It will be also obvious that any type of relief valve would suffice providing its sealed area was small so that the force on the valve would be low despite the high fluid pressure.

Figure 13:
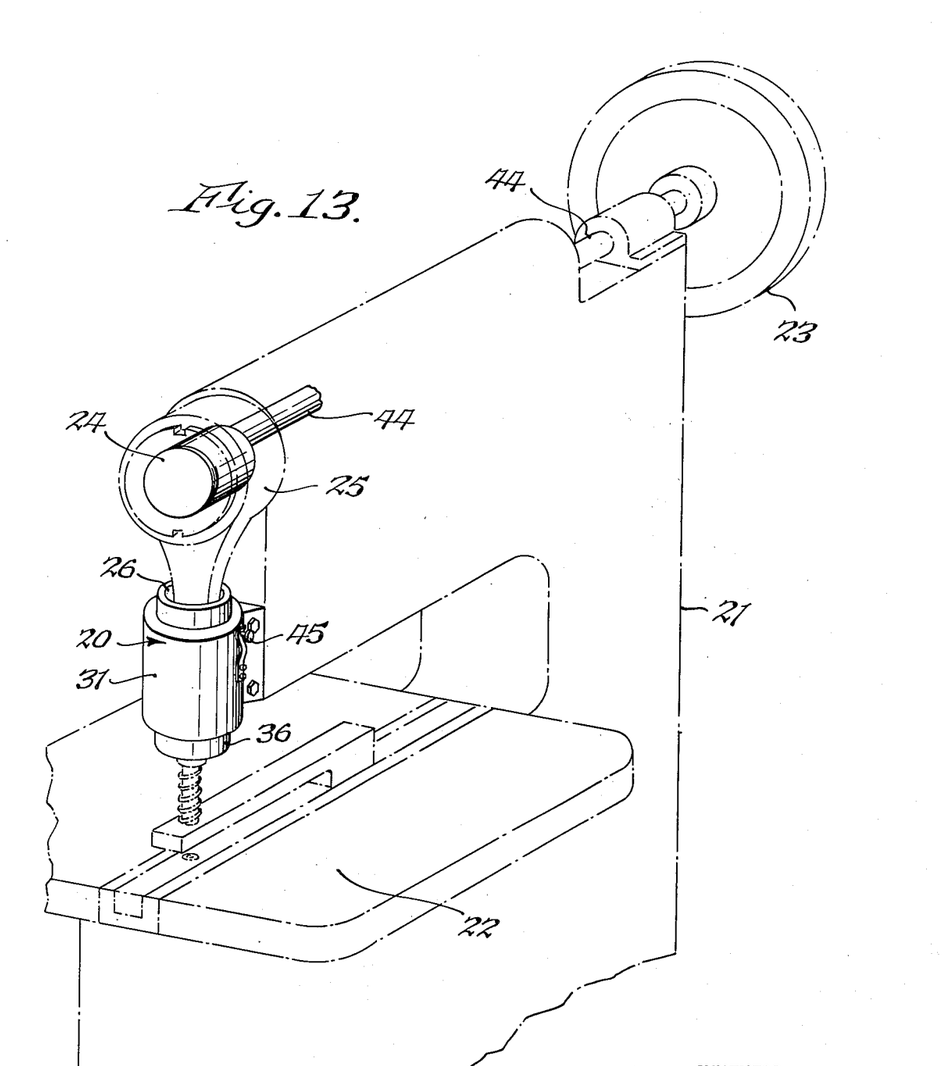
Fig. 13 shows how this apparatus can be adapted to use on a press-working machine tool, so as to provide the intermittent press-working stroke.

On Fig. 13 I have illustrated my apparatus 20 as it would appear when operably mounted to an end-wheel gap-type press 21 of the same general character as is illustrated in Fig. 13 of my Patent No. 2,364,011. Actuating apparatus 20 has replaced the conventional clutch 131 and eliminated the non-repeat and clutch actuating linkage 132, illustrated in that patent, as actuating button 45 of my present device is readily operated since it is in juxtaposition to the working area 22. A further comparison of the installation of clutch assembly 131 to press 121 of my former patent will reveal that whereas actuating apparatus 20 is a complete sub-assembly mounted to the press 21 and eccentric 24 of shaft 44 after flywheel 23 and shaft 44 have been previously assembled to the press 21, clutch 131 must be assembled to the press 121 prior to flywheel 130 and linkage 132 must then be adjusted on the press 131. It will also be obvious, to one skilled in the art, that in my present invention, shaft 44 is continuously revolving and pitman arm 25 is continuously reciprocating with upper piston 26, so that only the inertia of the reciprocable ported cylinder 36 must be overcome when the mechanism is actuated, whereas in my former patent, the inertia of the long crankshaft, pitman arm and clutch mechanism must also be overcome by clutch 131. While I am here illustrating my device as applied to punch presses because of its unusual advantages relative thereto, it will be obvious to one skilled in the art, that it can be employed in all like machine applications.

In accordance with this application of my invention, I employ the eccentric crankpin 24 at the end of the crankshaft 44 which drives the pitman arm 25 connecting the crankshaft 44 to my apparatus for causing a reciprocable movement. As illustrated, reciprocable cylinder 36 becomes the ram 36 when my device is applied to press-working machine tools, but it can be any reciprocable element on any machine.

As described previously, actuating apparatus 20 is a completely self-contained unit within the separable housing 31 which with pitman arm 25 can be removed from and assembled to the press frame 21 as an operable unit assembly. This is accomplished by sliding pitman arm 25 on to the eccentric 24 of shaft 44 and attaching the four hold-down bolts 39. Actuating apparatus 20 is then operable by actuating button 45 without other attachments or operations.

It will now be obvious, to those skilled in the art, that assembly 20 is more compact and easily installed when compared with other apparatus or clutches for providing a reciprocable action in press-working or other machines. This arrangement provides a suitable sub-assembly for the mass production techniques as well as a rapid means for servicing the apparatus by substituting bench tear-down and inspection for the more costly servicing and inspection while on a machine.

Referring again to Figures 9 and 10, it will be obvious to those skilled in the art, that the reduction in area of reciprocable piston 56 over the reciprocating piston 26 will cause a greater movement of reciprocable piston 56 than is accomplished in the devices of my previous illustrations. This can be utilized to provide a greater stroke, or in the event a drawing process on a press-working machine is required, a single or double draw can be provided as stop 67 can be removed to permit the piston 56 or ram 36 to operate in the sequence dependent upon the pressure on their relative parts. For instance, this would mean in press operation, that if a solid die were used it would be backed up by the bed of the press to provide a solid stop base. If it were then to be engaged by ram 36, during its stroke, the inner ram 56 would be caused to move downwardly, drawing metal or other material therebetween, while maintaining the metal under ram 36 under high pressure, so as to effect a good single drawing operation. By suitable die and resilient pressure pad design a double draw can be provided as the resilient resisting force of the pressure pad under either ram 36 or 56 could be varied to cause the other to operate first.

It will be obvious to those skilled in the art, that my device has many applications in machine design and I intend that all such applications be included by the claims appended hereto.

I claim:

1. A clutch comprising co-operative driving and driven elements which define a space for a fluid by which movement of one element may be transmitted to the other, and a chamber for a body of said fluid, one of said elements being movable to establish and cut off communication between said space and said chamber so that said elements may move relatively to one another or be caused to move in unison by fluid trapped between them.

2. A clutch comprising co-operating driving and driven elements which define a space for a fluid by which the movement of one element may be transmitted to the other, a chamber for a body of said fluid, one of said elements being movable to establish and cut off communication between said space and said chamber, whereby to control the transfer of fluid between said space and said chamber so that said elements may move relatively to one another or be caused to move in unison by fluid trapped between them, and means for maintaining the fluid in said chamber under pressure.

3. A clutch comprising co-operating driving and driven elements which define a space for a fluid by which movement of one element may be transmitted to the other, and a chamber for a body of said fluid, one of said elements being ported and being movable to establish and cut off communication between said space and said chamber, whereby to control the transfer of fluid between said space and said chamber so that said elements may move relatively to one another or be caused to move in unison by fluid trapped between them.

4. A clutch comprising co-operating reciprocable driving and driven elements which define a space for a fluid by which the movement of one element may be transmitted to the other, and a chamber for a body of said fluid, one of said elements being ported and being movable to establish and cut off communication between said space and said chamber, whereby to control the transfer of fluid between said space and said chamber so that said elements may move relatively to one another or be caused to move in unison by fluid trapped between them.

5. A clutch comprising co-operating reciprocable driving and driven elements which define a space for a fluid by which the movement of one element may be transmitted to the other, said elements being coaxial and one being located within the other, and a chamber for a body of said fluid, one of said elements being ported and being movable to establish and cut off communication between said space and said chamber, whereby to control the transfer of fluid between said space and said chamber so that said elements may move relatively to one another or be caused to move in unison by fluid trapped between them.

6. A clutch comprising co-operating driving and driven elements which define a space for a fluid by which the movement of one element may be transmitted to the other, a chamber for a body of said fluid, one of said elements being ported and being movable to establish and cut off communication between said space and said chamber, whereby to control the transfer of fluid between said space and said chamber so that said elements may move relatively to one another or be caused to move in unison by fluid trapped between them, and means for placing the fluid in said chamber under pressure.

7. A clutch comprising co-operating driving and driven elements which define a space for a fluid by which the movement of one element may be transmitted to the other, a chamber for a body of said fluid, one of said elements being ported and being movable to establish and cut off communication between said space and said chamber, whereby to control the transfer of fluid between said space and said chamber so that said elements may move relatively to one another or be caused to move in unison by the fluid trapped between them, and an air inlet valve for connecting said chamber to the atmosphere so that air may be drawn into said chamber to place the fluid therein under pressure.

8. A clutch comprising a driving element and a driven element, one of said elements being in the form of a reciprocal piston and the other of said elements being in the form of a reciprocable cylinder, a fluid chamber, an air inlet valve connecting said chamber to atmosphere, and means for establishing and cutting off communication between said cylinder and chamber, whereby to control the transfer of fluid between said cylinder and chamber in such a manner that said piston and cylinder may move relatively to one another or be caused to move in unison by fluid trapped between them.

9. A clutch comprising a driving element and a driven element, one of said elements being in the form of a reciprocal piston and the other of said elements being in the form of a reciprocable cylinder, a fluid chamber, means for maintaining the fluid in said chamber under pressure, and means for establishing and cutting off communication between said cylinder and chamber, whereby to control the transfer of fluid between said cylinder and chamber in such a manner that said piston and cylinder may move relatively to one another or be caused to move in unison by fluid trapped between them.

10. A clutch comprising a driving element and a driven element, one of said elements being in the form of a reciprocal piston and the other of said elements being in the form of a reciprocable cylinder in which said piston is movable, said cylinder having a ported section, a fluid chamber, and means operable at will, including the ported section of said cylinder for establishing and cutting off communication between said cylinder and chamber, whereby to control the transfer of fluid between said cylinder and chamber in such a manner that said piston and cylinder may move relatively to one another or be caused to move in unison by fluid trapped between them.

11. A clutch comprising a driving element and a driven element, one of said elements being in the form of a reciprocal piston and the other of said elements being in the form of a reciprocable cylinder, a fluid chamber, and means for establishing and cutting off communication between said cylinder and said chamber, whereby to control the transfer of fluid between said cylinder and chamber in such a manner that said piston and cylinder may move relatively to one another or be caused to move in unison by fluid trapped between them.

12. A clutch comprising a driving element and a driven element, one of said elements being in the form of a reciprocal piston and the other of said elements being in the form of a reciprocable cylinder, a fluid chamber, and means including said cylinder for establishing and cutting off communication between said cylinder and said chamber, whereby to control the transfer of fluid between said cylinder and chamber in such a manner that said piston and cylinder may move relatively to one another or be caused to move in unison by fluid trapped between them.

13. A clutch comprising a driving element and a driven element, one of said elements being in the form of a reciprocal piston and the other of said elements being in the form of a reciprocable cylinder, said cylinder having a ported section, a fluid chamber, and means including the ported section of said cylinder for establishing and cutting off communication between said cylinder and chamber, whereby to control the transfer of fluid between said cylinder and chamber in such a manner that said piston and cylinder may move relatively to one another or be caused to move in unison by fluid trapped between them.

14. A clutch comprising a driving element in the form of a reciprocal piston and a driven element in the form of a reciprocable cylinder, said piston being operable within said cylinder and co-operating therewith to define a space for fluid by which the movement of said piston may be transmitted to said cylinder, a chamber for a body of said fluid, and means for establishing and cutting off communication between said space and said chamber so that piston and cylinder may move relatively to one another or be caused to move in unison by fluid trapped between them.

15. A clutch comprising a driving element in the form of a reciprocal piston and a driven element in the form of a reciprocable cylinder, said piston being operable within said cylinder and co-operating therewith to define a space for fluid by which the movement of said piston may be transmitted to said cylinder, and a chamber for a body of said fluid, said cylinder being movable to establish and cut off communication between said space and said chamber so that said piston and cylinder may move relatively to one another or be caused to move in unison by fluid trapped between them.

16. A clutch comprising a driving element in the form of a reciprocal piston and a driven element in the form of a reciprocable cylinder having a ported section, said piston being operable within said cylinder and co-operating therewith to define a space for fluid by which the movement of said piston may be transmitted to said cylinder, and a chamber for a body of said fluid, said cylinder being movable so that said ported section may establish and cut off communication between said space and said chamber so that said piston and cylinder may move relatively to one another or be caused to move in unison by fluid trapped between them.

17. A clutch comprising a driving element in the form of a reciprocal piston and a driven element in the form of a reciprocable cylinder having a ported section, said piston being operable within said cylinder and co-operating therewith to define a space for fluid by which the movement of said piston may be transmitted to said cylinder, a chamber for a body of said fluid, said cylinder being movable so that said ported section may establish and cut off communication between said space and said chamber so that said piston and cylinder may move relatively to one another or be caused to move in unison by fluid trapped between them, and means for maintaining the fluid in said chamber under pressure.

18. A clutch comprising a driving element in the form of a reciprocal piston and a driven element in the form of a reciprocable cylinder having a ported section, said piston being operable within said cylinder and co-operating therewith to define a space for fluid by which the movement of said piston may be transmitted to said cylinder, a chamber for a body of said fluid, said cylinder being movable so that said ported section may establish and cut off communication between said space and said chamber so that said piston and cylinder may move relatively to one another or be caused to move in unison by fluid trapped between them, and an air inlet valve in said chamber through which the latter communicates with the atmosphere.

19. A clutch comprising co-operating driving and driven elements, one of said elements being in the form of a reciprocal piston and the other of said elements being in the form of a reciprocable cylinder, said piston and cylinder defining a space for a fluid by which the movement of one may be transmitted to the other, a chamber for a body of said fluid, said cylinder being movable to establish and cut off communication between said space and said chamber so that said piston and cylinder may move relatively to one another or be caused to move in unison by fluid trapped between them, and means for holding said cylinder against movement in the position in which it establishes communication between said space and said chamber.

20. A clutch comprising co-operating driving and driven elements, one of said elements being in the form of a reciprocal piston and the other of said elements being in the form of a reciprocable cylinder having a ported section, said piston being movable within said cylinder and co-operating therewith to define a space for a fluid by which the movement of one may be transmitted to the other, a chamber for a body of said fluid, said cylinder being movable so that said ported section may establish and cut off communication between said space and said chamber so that said piston and cylinder may move relatively to one another or be caused to move in unison by fluid trapped between them, and means for holding said cylinder against movement in the position in which said ported section establishes communication between said space and said chamber.

21. A clutch comprising co-operating driving and driven elements, one of said elements being in the form of a reciprocal piston and the other of said elements being in the form of a reciprocable cylinder having a ported section, said piston being movable within said cylinder and co-operating therewith to define a space for a fluid by which the movement of one may be transmitted to the other, a chamber for a body of said fluid, said cylinder being movable so that said ported section may establish and cut off communication between said space and said chamber so that said piston and cylinder may move relatively to one another or be caused to move in unison by fluid trapped between them, means for holding said cylinder against movement in the position in which said ported section establishes communication between said space and said chamber, and means for maintaining the fluid in said chamber under pressure.

22. A clutch comprising cooperating driving and driven elements, the driving element being in the form of a reciprocal piston and the driven element being in the form of a reciprocable sleeve surrounding said piston and having a ported section, a second driven element comprising a free piston slidable within the sleeve, said driving and driven elements defining a space for fluid by which the movement of the driving element may be transmitted to the driven elements, a chamber for a body of said fluid, said sleeve being movable so that the ported section may establish and cut off communication between said space and said chamber so that said elements may move relatively to one another or be caused to move in unison, said free piston having a smaller effective area than the first piston whereby when communication is cut off by said sleeve motion will be transmitted by the first piston through the fluid to said free piston in proportion to their respective areas.

23. A device of the character described comprising a housing having a chamber therein for containing a liquid, a cylinder reciprocable in said housing, a piston reciprocable in said cylinder, means for reciprocating said piston, said cylinder being closed at one end and having ports adjacent said one end through which liquid may flow back and forth between said chamber and said cylinder when said cylinder is in one position, said housing having a portion into which the cylinder ports move and by which they are closed when said cylinder moves to another position, whereby liquid may be trapped in the last-named position of said cylinder, between said piston and the closed end wall of said cylinder so that said cylinder may be driven through said trapped liquid on movement of said piston in one direction, and means for releasably securing said cylinder to said housing to hold said cylinder

13 against movement relative to said housing when said cylinder is in said one position.

24. A device of the character described comprising a housing having a chamber therein for containing a liquid, a cylinder reciprocable in said housing, a piston reciprocable in said cylinder, means for reciprocating said piston, said cylinder being closed at one end and having ports adjacent said one end through which liquid may flow back and forth between said chamber and said cylinder when said cylinder is in one position, said housing having a portion into which the cylinder ports move and by which they are closed when said cylinder moves to another position whereby liquid may be trapped, in the last-named position of said cylinder, between said piston and the closed end wall of said cylinder so that said cylinder may be driven through said trapped liquid on movement of said piston in one direction, a member adjustably connected to said cylinder in position to be engaged by said piston when said piston is moved in the opposite direction to move said cylinder in the opposite direction, and means for releasably securing said cylinder to said housing to hold said cylinder against movement relative to said housing when said cylinder is in said one position.

25. A device of the character described comprising a housing having a chamber therein for containing a liquid, a cylinder reciprocable in said housing, a piston reciprocable in said cylinder, means for reciprocating said piston, said cylinder being closed at one end and having ports adjacent said one end through which liquid may flow back and forth between said chamber and said cylinder when said cylinder is in one position, said housing having a portion into which the cylinder ports move and by which they are closed when said cylinder moves to another position, whereby liquid may be trapped, in the last-named position of said cylinder, between said piston and the closed end wall of said cylinder so that said cylinder may be driven through said trapped liquid on movement of said piston in one direction, a check valve in said housing through which air may be admitted to said chamber, a detent for releasably securing said cylinder to said housing to hold said cylinder against movement relative to said housing when said cylinder is in said one position, and resilient means biasing said detent toward operative position.

26. A device of the character described comprising a housing, a cylinder reciprocable axially in said housing, a first piston reciprocable in said cylinder, said cylinder being closed at one end, a second piston reciprocably mounted in the closed end of said cylinder, said first and second pistons defining a space for a liquid, a chamber for a body of said liquid, means adapted to connect said chamber with said space to permit flow of liquid back and forth between said chamber and space, means operable on movement of said cylinder in one direction to cut off communication between said chamber and space whereby to trap liquid between the two pistons to permit the first piston on movement in one direction to impart movement to the second, means for reciprocating said first piston, and means for biasing said second piston toward said first piston, the areas of the opposed faces of the two pistons being different, and the second piston having the smaller area.

27. A device of the character described comprising a housing, a cylinder reciprocable axially in said housing, a first piston reciprocable in said cylinder, said cylinder being closed at one end, a second piston reciprocably mounted in the closed end of said cylinder, said first and second pistons defining a space for a liquid, a chamber for a body of said liquid, means adapted to connect said chamber with said space to permit flow of liquid back and forth between said chamber and space, means operable on movement of said cylinder in one direction to cut off communication between said chamber and space whereby to trap liquid between the two pistons to permit the first piston on movement in one direction to impart movement to the second, means for reciprocating said first piston, and means for biasing said second piston toward said first piston, the areas of the opposed faces of the two pistons being different, and the second piston having the smaller area, means for releasably securing said cylinder to said housing to hold said cylinder against movement relative to said housing, and a stop secured to said housing for limiting the movement of said cylinder when it has been released and the first piston is driving the second piston.

28. A device of the character described comprising a housing having a chamber therein for containing a liquid, a cylinder reciprocable in said housing, a first piston reciprocable in said cylinder, means for reciprocating said first piston, said cylinder being closed at one end and having ports through which liquid may flow back and forth between said chamber and said cylinder when said cylinder is in one position, a second piston reciprocably mounted in the closed end of said cylinder, and means for biasing said second piston toward said first piston, said housing having a portion into which the cylinder ports move and by which they are closed when said cylinder moves to another position, whereby liquid may be trapped in said cylinder between the two pistons so that said second piston may be driven through the trapped liquid on movement of said first piston in one direction, the areas of the opposed faces of the two pistons being different, and the second piston having the smaller area.

29. A device of the character described comprising a housing having a chamber therein for containing a liquid, a cylinder reciprocable in said housing, a first piston reciprocable in said cylinder, means for reciprocating said first piston, said cylinder being closed at one end and having ports through which liquid may flow back and forth between said chamber and said cylinder when said cylinder is in one position, a second piston reciprocably mounted in the closed end of said cylinder, and means for biasing said second piston toward said first piston, said housing having a portion into which the cylinder ports move and by which they are closed when said cylinder moves to another position, whereby liquid may be trapped in said cylinder between the two pistons so that said second piston may be driven through the trapped liquid on movement of said first piston in one direction, the areas of the opposed faces of the two pistons being different, and the second piston having the smaller area, and means for releasably securing said cylinder to said housing to hold said cylinder against movement relative to said housing when said cylinder is in said one position.

30. A device of the character described comprising a housing having a chamber therein for containing a liquid, a cylinder reciprocable in said housing, a first piston reciprocable in said cylinder, means for reciprocating said first piston, said cylinder being closed at one end and having ports through which liquid may flow back and forth between said chamber and said cylinder when said cylinder is in one position, a second piston reciprocably mounted in the closed end of said cylinder, and means for biasing said second piston toward said first piston, said housing having a portion into which the cylinder ports move and by which they are closed when said cylinder moves to another position, whereby liquid may be trapped in said cylinder between the two pistons so that said second piston may be driven through the trapped liquid on movement of said first piston in one direction, the areas of the opposed faces of the two pistons being different, and the second piston having the smaller area, and means for releasably securing said cylinder to said housing to hold said cylinder against movement relative to said housing when said cylinder is in said one position, and a stop secured to said housing for limiting the movement of said cylinder when it has been released and the first piston is driving the second piston.

GEORGE F. WALES.

REFERENCES CITED

The following references are of record in the file of this patent:

UNITED STATES PATENTS

| Number | Name | Date |
|---|---|---|
| 414,910 | Krause | Nov. 12, 1889 |
| 662,515 | Yale | Nov. 27, 1900 |
| 2,135,011 | McGauchie | Nov. 1, 1938 |
| 2,227,279 | Smith | Dec. 31, 1940 |
| 2,296,283 | Jorgensen | Sept. 22, 1942 |
| 2,444,018 | Deloghia | June 22, 1948 |
| 2,446,862 | Wilders | Aug. 10, 1948 |
| 2,447,886 | Worth | Aug. 24, 1948 |